Patented Dec. 8, 1925.

1,564,584

UNITED STATES PATENT OFFICE.

GEORG KRÄNZLEIN, MARTIN CORELL, AND ROBERT SEDLMAYR, OF HOCHST-ON-THE-MAIN, GERMANY, ASSIGNORS, MY MESNE ASSIGNMENTS, TO GRASELLI DYESTUFF CORPORATION, OF NEW YORK, N. Y., A CORPORATION OF DELAWARE.

CONDENSATION PRODUCT OF THE ANTHRAQUINONE SERIES AND PROCESS OF MAKING SAME.

No Drawing.   Application filed September 27, 1923.   Serial No. 665,225.

*To all whom it may concern:*

Be it known that we, GEORG KRÄNZLEIN, MARTIN CORELL, and ROBERT SEDLMAYR, citizens of Germany, residing at Hochst-on-the-Main, Germany, have invented certain new and useful Improvements in Condensation Products of the Anthraquinone Series and Processes of Making Same, of which the following is a specification.

We have made the surprising observation that benzanthrone and its derivatives when combined with aromatic acid chlorides in presence of catalytically acting or condensing agents yield new condensation products which are valuable vat-dyestuffs and can be used as parent materials for the preparation of new dyestuffs. Thus by combining for instance benzanthrone with benzoylchloride in presence of aluminium chloride, to which there may be added some zinc chloride a melt is obtained while hydrochloric acid is split off, which melt, after being suitably worked up, yields an orange-yellow powder forming after recrystallization from solvents possessing a high boiling point, a yellow vat-dyestuff which gives the following analytical figures:— calculated for $C_{24}H_{12}O_2$: C=86.74% found: 87.01%
　　　　　　　　　　　　　　H=3.62%　　" : 4.03%

The dyestuff thus obtained appears to be formed according to the following reactions:

The acid chloride first acts on the very unstable hydrogen in the 3 para position of the benzene ring, eliminating HCl and forming 3-para-benzoyl benzanthrone:

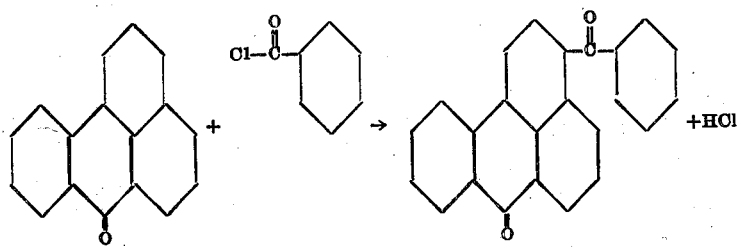

This intermediate product condenses, yielding the 3, 4, 8, 9-dibenzo-pyrenequinone:

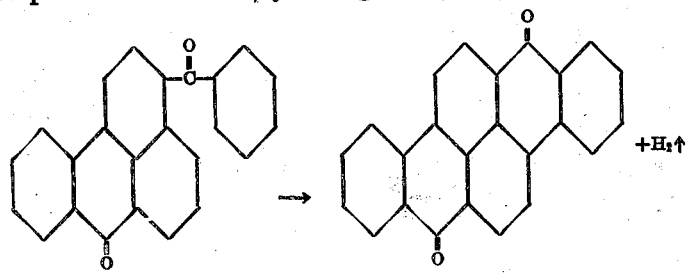

The product thus obtained would, therefore, possess the formula of a 3.4.8.9-dibenzo-pyrenequinone:

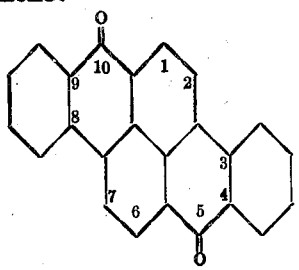

The new dyestuff yields a red vat with a blue hue, which gives on cotton a deep and very fast orange tint.

*Examples.*

1. To a mixture of 58 parts of benzanthrone, 10 parts of zinc-chloride and 290 parts of aluminium chloride are slowly added 200 parts of benzoylchloride, this mixture is then maintained for about 16 hours at an internal temperature of 155° C.

whereby a strong evolution of hydrochloric acid takes place.

The reaction mass is boiled up with water and concentrated hydrochloric acid and washed until it becomes neutral; then extracted several times with alkaline hydrosulphite solution and the resulting solution of the dyestuff is oxidized by blowing air through it whereby the dyestuff is separated.

The dyestuff constitutes a brownish-yellow powder. It crystallizes from quinoline in sharply pointed crystals, melts at over 300° C. and dissolves in concentrated sulphuric acid with a bluish-violet color and in high per cent oleum with blue color. The dyestuff dyes cotton from a bluish-red vat carmin-red tints and when steamed bright orange-yellow tints.

2. To a mixture of 58 parts of benzanthrone and 290 parts of aluminium chloride are added 75 parts of p-toluic acid chloride. This mixture is maintained for about 16 hours at an internal temperature of 160° C.

The purification of the raw-material may be effected in the same manner as indicated in Example 1. When treated with solvents of a high boiling point the dyestuff separates in the form of silk-like, brown needles which dissolve in concentrated sulphuric acid with a bluish-red tint and having a melting-point of over 315° C.

From a red vat the dyestuff gives on cotton a brownish-red tint and when steamed a somewhat lighter yellow tint than that obtained according to Example 1.

3. To 58 parts of benzanthrone, which are finely powdered with 580 parts of aluminiumchloride, are added 262 parts of m-chlorobenzoylchloride. The mixture is heated while stirring for 8 hours to 180° internal temperature. The purification of the raw melt may be effected as indicated in Example 1. The dyestuff forms a product similar to that obtained according to Example 1, but it is better in tinctorial power and fastness to light.

4. 49 parts of β-methyl benzanthrone are finely powdered with 290 parts of aluminiumchloride and kept, together with 112 parts of benzoylchloride, for 6 hours at an internal temperature of 160-180° C. The purification of the raw melt may be effected as indicated in Example 1. The dyestuff is similar as regards its properties to that mentioned in Example 1, but gives on cotton yellow tints with a greener hue.

Instead of β-methylbenzanthrone there may be used also for instance β-chloro- or 1.8.dichloro-benzanthrone. In the same way there is obtained, by using α-oxy-benzanthrone as starting material, a condensation product which dyes cotton and wool red tints.

Having now described our invention, what we claim is:

1. As new articles of manufacture the bodies possessing the general formula:

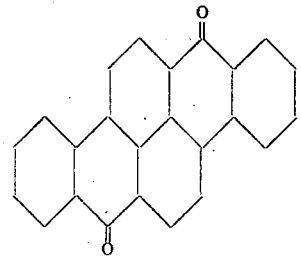

corresponding to a 3.4.8.9-dibenzopyrenequinone, which may be substituted in any way, which bodies are by themselves valuable vat-dyestuffs and can be used as starting material for the preparation of new dyestuffs.

2. Process of producing condensation products of the anthraquinone series, which consists in heating a benzanthrone with an aromatic acid chloride in the presence of a condensing agent.

In testimony whereof, we affix our signatures.

GEORG KRÄNZLEIN.
MARTIN CORELL.
ROBERT SEDLMAYR.